(12) United States Patent     (10) Patent No.:   US 12,618,336 B2

Berry     (45) Date of Patent:     May 5, 2026

(54) TURBOMACHINE IMPINGEMENT COOLING MODULES

(71) Applicant: GE Vernova Infrastructure Technology LLC, Greenville, SC (US)

(72) Inventor: Jonathan Dwight Berry, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/901,808

(22) Filed: Sep. 30, 2024

(65) Prior Publication Data

US 2026/0092537 A1     Apr. 2, 2026

(51) Int. Cl.
| | | |
|---|---|---|
| *F01D 25/12* | (2006.01) | |
| *F01D 9/02* | (2006.01) | |
| *F02C 3/14* | (2006.01) | |

(52) U.S. Cl.
CPC ............. *F01D 25/12* (2013.01); *F01D 9/023* (2013.01); *F02C 3/14* (2013.01); *F02C 3/145* (2013.01); *F05D 2240/35* (2013.01); *F05D 2260/201* (2013.01); *F23C 2201/401* (2013.01)

(58) Field of Classification Search
CPC .. F01D 25/12; F01D 9/023; F02C 3/14; F02C 3/145; F05D 2240/35; F05D 2260/201; F23C 2201/401
See application file for complete search history.

(56) References Cited

U.S. PATENT DOCUMENTS

| | | | | |
|---|---|---|---|---|
| 5,391,052 | A * | 2/1995 | Correia | F01D 11/10 |
| | | | | 415/115 |
| 5,480,281 | A * | 1/1996 | Correia | F01D 25/12 |
| | | | | 415/115 |
| 5,533,864 | A * | 7/1996 | Nomoto | F23R 3/002 |
| | | | | 415/115 |
| 7,219,498 | B2 * | 5/2007 | Hadder | F23R 3/007 |
| | | | | 60/752 |
| 7,310,938 | B2 | 12/2007 | Marcum et al. | |
| 8,015,817 | B2 * | 9/2011 | Charron | F01D 9/023 |
| | | | | 60/752 |
| 8,499,566 | B2 | 8/2013 | Lacy et al. | |
| 11,371,702 | B2 | 6/2022 | Berry et al. | |

(Continued)

OTHER PUBLICATIONS

Nishimura, et al., The Approach to the Development of the Next Generation Gas Turbine and History of Tohoku Electric Power Company Combined Cycle Power Plants, Proceedings of the ASME 2011 Turbo Expo: Turbine Technical Conference and Exposition, GT2011-45464, vol. 3: Controls, Diagnostics and Instrumentation; Education; Electric Power; Microturbines and Small Turbomachinery; Solar Brayton and Rankine Cycle, Vancouver, British Columbia, Canada. Jun. 6-10, 2011, 595-600. https://doi.org/10.1115/GT2011-45464 (Abstract Only).

*Primary Examiner* — Brian Christopher Delrue

(74) *Attorney, Agent, or Firm* — Dority & Manning, P.A.

(57) ABSTRACT

An impingement module for localized cooling a hot gas path component of a turbomachine includes a plurality of impingement orifices. The impingement module is positioned with the plurality of impingement orifices oriented towards an outer surface of the hot gas path component. Thus, the impingement module is configured to receive a flow of pressurized air and direct the pressurized air through the impingement orifices to impinge on the outer surface of the component.

20 Claims, 13 Drawing Sheets

(56)          References Cited

U.S. PATENT DOCUMENTS

| | | | |
|---|---|---|---|
| 2005/0150632 A1* | 7/2005 | Mayer | F02K 1/822 |
| | | | 165/47 |
| 2010/0251723 A1* | 10/2010 | Chen | F02C 7/18 |
| | | | 60/760 |
| 2012/0034075 A1* | 2/2012 | Hsu | F23R 3/005 |
| | | | 415/178 |
| 2014/0260257 A1 | 9/2014 | Rullaud et al. | |
| 2014/0338304 A1* | 11/2014 | Schilp | F23R 3/002 |
| | | | 60/39.23 |
| 2018/0066539 A1* | 3/2018 | Romanov | F23R 3/005 |
| 2018/0320898 A1* | 11/2018 | Uhm | F02C 7/18 |
| 2022/0127963 A1* | 4/2022 | Lee | F01D 5/18 |

* cited by examiner

200

200

200

200

200

66

200

TURBOMACHINE IMPINGEMENT COOLING MODULES

FIELD

The present disclosure relates generally to hot gas path components, e.g., combustors, for turbomachines. More particularly, the present disclosure relates to systems for cooling such components.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In many turbomachine combustors, combustion gases are routed towards an inlet of the turbine section of the gas turbine engine through a hot gas path that is at least partially defined by a combustion liner that extends downstream from a fuel nozzle and terminates at the inlet to the turbine section. Accordingly, high combustion gas temperatures within the turbine section generally correspond to greater thermal and kinetic energy transfer between the combustion gases and the turbine, thereby enhancing overall power output of the turbomachine. However, the high combustion gas temperatures may lead to erosion, creep, and/or low cycle fatigue to the various components of the combustor, thereby limiting overall durability of the combustor.

Thus, it is necessary to cool the components of the turbomachine which lie along the hot gas path, such as the combustion liner. For example, cooling of the combustion liner is typically achieved by routing a cooling medium, such as the compressed working fluid from the compressor section, through a cooling flow annulus or flow passage defined between the liner and a flow sleeve and/or an impingement sleeve that surrounds the liner. The flow of cooling medium in the flow passage, e.g., between the liner and the sleeve, may become turbulent such that contact between the cooling medium and the hot gas path surface to be cooled, e.g., outer surface of the combustion liner, is inconsistent in direction and/or duration. Thus, such cross-flow or turbulent flow may result in reduced cooling of the hot gas path surface. Additionally, variations in the flow and/or concentration of high temperature combustion gases, as well as variations in the structure of the hot gas path components (e.g., such that portions of the hot gas path component are on the lee side of other components, such as on the lee side of axially-staged fuel injectors) may lead to development of localized heat concentrations, e.g., hot spots, where the temperature of the hot gas path component may be significantly higher than adjoining areas.

Accordingly, an improved system for cooling a turbomachine combustor is desired in the art. In particular, a system which provides localized cooling, e.g., at one or more hot spots, and/or which provides impingement cooling with controlled and even flow to minimize or avoid cross-flow, would be useful.

BRIEF DESCRIPTION

Aspects and advantages of the systems in accordance with the present disclosure will be set forth in part in the following description, or may be obvious from the description, or may be learned through practice of the technology.

In accordance with one embodiment, a turbomachine is provided. The turbomachine includes a compressor, a combustor, and a turbine downstream of the combustor. The compressor extends from an inlet to a discharge. The discharge of the compressor provides a flow of high pressure air directly into a high pressure plenum defined within an outer casing of the turbomachine. The combustor includes a head end, a liner at least partially defining a hot gas path, a flow sleeve circumferentially surrounding at least a portion of the liner, and an impingement module. The flow sleeve is spaced from the liner to form a cooling flow annulus therebetween. The cooling flow annulus is in fluid communication with the high pressure plenum whereby air from the high pressure plenum flows into the cooling flow annulus and from the cooling flow annulus to the head end. The impingement module extends into the cooling flow annulus with the plurality of impingement orifices oriented towards an outer surface of the liner. Thus, the impingement module is configured to direct a flow of air from the high pressure plenum through the impingement orifices to impinge on the outer surface of the liner.

In accordance with another embodiment, an impingement module for cooling a hot gas path component of a turbomachine is provided. The impingement module has a plurality of impingement orifices. The impingement module is positioned with the plurality of impingement orifices oriented towards a surface of the hot gas path component. Thus, the impingement module is configured to receive a flow of pressurized air and direct the pressurized air through the impingement orifices to impinge on the surface of the component.

In accordance with a further embodiment, a flow sleeve for a combustor is provided. The combustor includes a liner at least partially defining a hot gas path. The flow sleeve is configured to mount to the combustor whereby the flow sleeve circumferentially surrounds at least a portion of the liner with the flow sleeve spaced from the liner to form a cooling flow annulus therebetween. The flow sleeve includes a supply tube extending inward towards the liner and an impingement module coupled to the supply tube. The impingement module has a plurality of impingement orifices. The impingement module is positioned with the plurality of impingement orifices oriented towards an outer surface of the liner. Thus, the impingement module is configured to direct a flow of air through the impingement orifices to impinge on the outer surface of the liner.

These and other features, aspects and advantages of the present assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present systems, including the best mode of making and using the present assemblies, directed to one of ordinary skill in the art, is set forth in the specification, which makes reference to the appended figures, in which.

DETAILED DESCRIPTION

Figure 1:
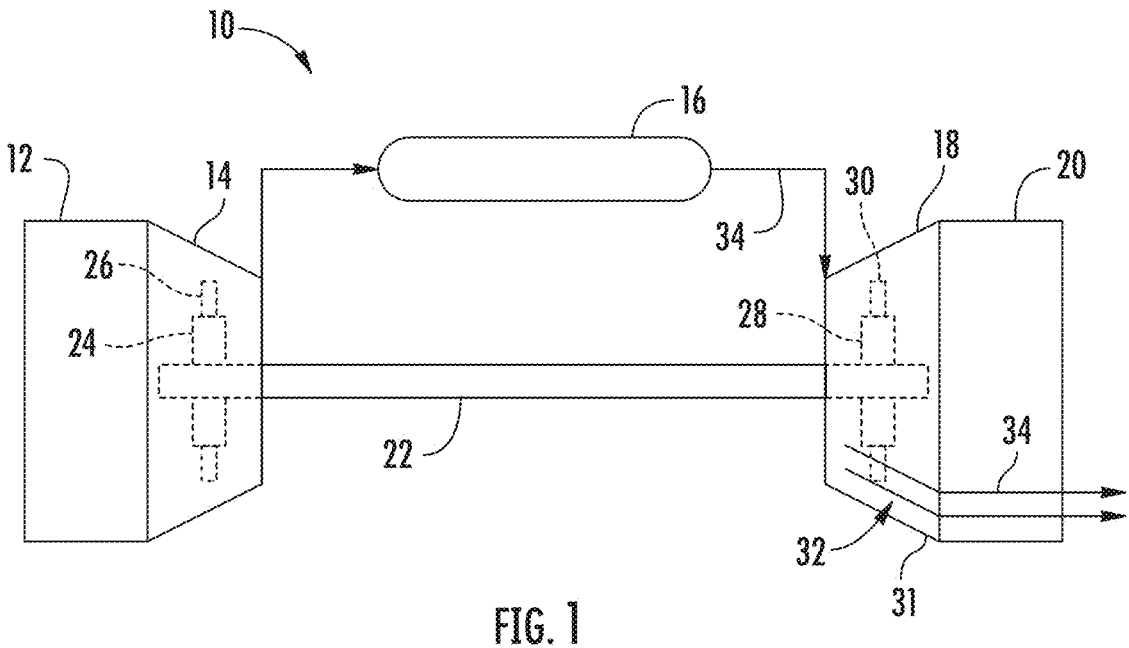
FIG. 1 is a schematic illustration of a turbomachine in accordance with exemplary embodiments of the present disclosure.

Reference now will be made in detail to embodiments of the present systems, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel to and/or coaxially aligned with an axial centerline of a particular component, and the term "circumferentially" refers to the relative direction that extends around the axial centerline of a particular component. Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial or land-based gas turbine unless otherwise specified in the claims. For example, the systems as described herein may be used in any type of turbomachine including, but not limited to, a steam turbine, an aircraft gas turbine, or a marine gas turbine.

Figure 2:
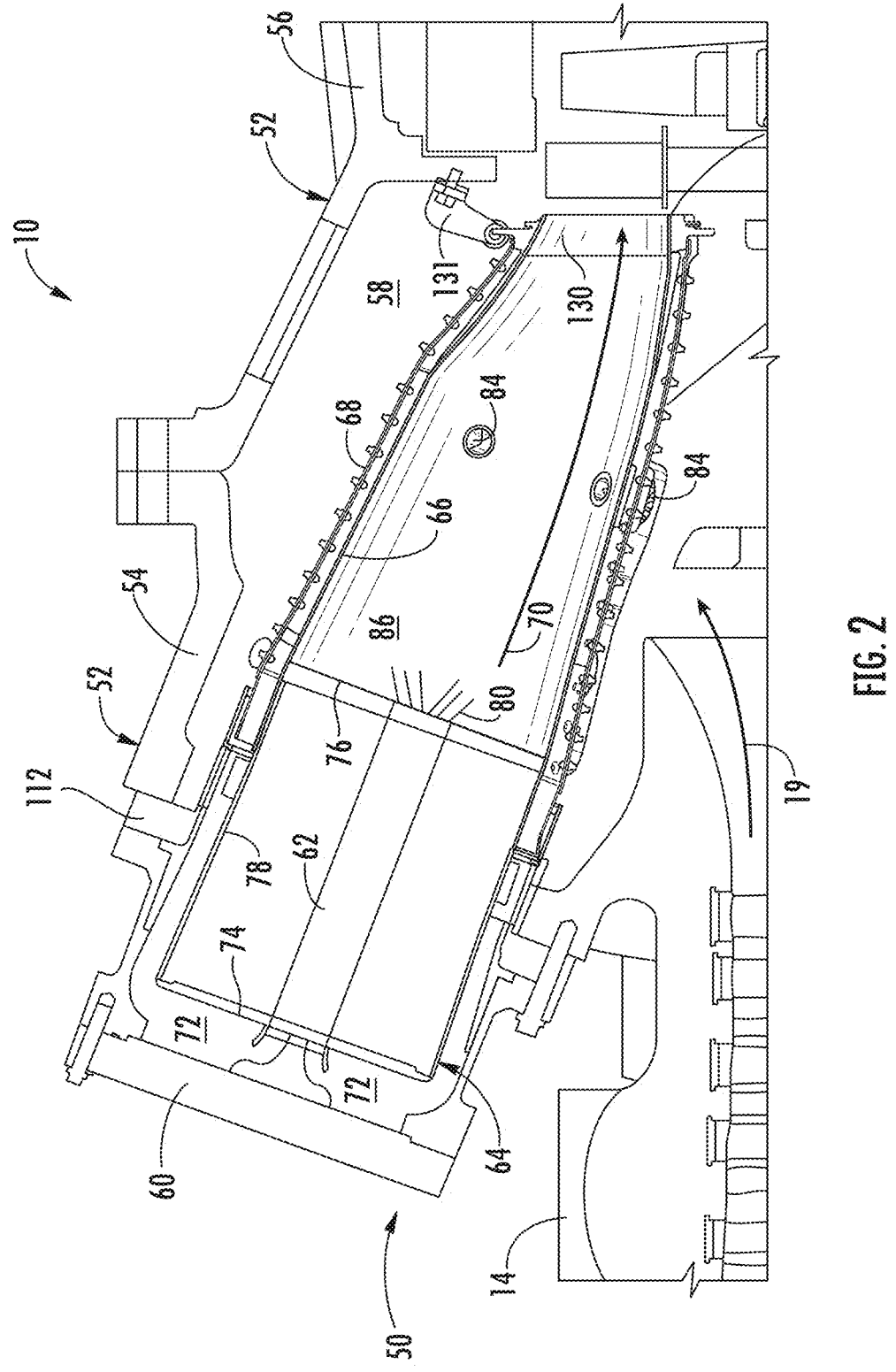
FIG. 2 illustrates a cross-sectional side view of a portion of an exemplary turbomachine, including an exemplary combustor that may encompass various embodiments of the present disclosure.

As shown, gas turbine engine 10 generally includes an inlet section 12, a compressor section 14 disposed downstream of the inlet section 12, a plurality of combustors 50 (an example one of which is illustrated in FIG. 2) within a combustor section 16 disposed downstream of the compressor section 14, a turbine section 18 (e.g., an expansion turbine section) disposed downstream of the combustor section 16, and an exhaust section 20 disposed downstream of the turbine section 18. Additionally, the gas turbine engine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine engine 10 via the exhaust section 20.

FIG. 2 provides a cross-sectional side view of a portion of an exemplary gas turbine engine 10 including an exemplary combustor 50, e.g., which may be one of several can-annular combustors provided in the combustor section 16 illustrated in FIG. 1 and described above. The illustrated exemplary combustor 50 may encompass various embodiments of the present disclosure. As shown, the combustor 50 is at least partially surrounded by an outer casing 52 (such as a compressor discharge casing 54 that is disposed downstream from the compressor 14) and/or an outer turbine casing 56. The outer casing 52 is in fluid communication with the compressor 14 and at least partially defines a high pressure plenum 58 that surrounds at least a portion of the combustor 50. An end cover 60 is coupled to the outer casing 52 at one end of the combustor 50.

As shown in FIG. 2, the combustor 50 generally includes at least one axially extending fuel nozzle 62 that extends downstream from the end cover 60, an annular cap assembly 64 that extends radially and axially within the outer casing 52 downstream from the end cover 60, an annular hot gas path duct or combustion liner 66 that extends downstream from the cap assembly 64 and an annular flow sleeve 68 that surrounds at least a portion of the combustion liner 66. The combustion liner 66 defines a hot gas path 70 for routing the combustion gases 34 through the combustor 50 (hot gas path 70 may be, e.g., contiguous with the hot gas path 32 in the turbine section 18 described above.) Also, the combustor section hot gas path 70 and the turbine section hot gas path 32 may collectively define an overall hot gas path of the turbine engine 10. The end cover 60 and the cap assembly 64 at least partially define a head end plenum 72 of the combustor 50.

The cap assembly 64 generally includes a forward end 74 that is positioned downstream from the end cover 60, an aft end 76 that is disposed downstream from the forward end 74, and one or more annular shrouds 78 that extend at least partially therebetween. The combustion liner 66 defines a combustion chamber 86 within the combustor 50, which is bounded at its forward end by a cap plate that defines the aft end 76 of the cap assembly 64. In particular embodiments, the axially extending fuel nozzle(s) 62 extend at least partially through the cap assembly 64 to provide a first combustible mixture 80 that consists primarily of fuel and a portion of the compressed working fluid 19, e.g., air, from the compressor 14, to the combustion chamber 86 that is defined within the combustion liner 66 downstream from the aft end 76 of the cap assembly 64.

In some embodiments, the combustor 50 may further include one or more radially extending fuel injectors 84 (also known as axially staged fuel injectors or late-lean fuel injectors) that extend through the flow sleeve 68 and the combustion liner 66 at a point that is downstream from the at least one axially extending fuel nozzle 62.

As shown in the exemplary embodiment in FIG. 2, the combustion liner 66 extends downstream to and terminates at an aft frame 130. A mounting bracket 131 may be coupled to the aft frame 130. In some embodiments, the aft frame

130 and/or the mounting bracket 131 may be coupled to the outer turbine casing 56 and a mounting flange 112 may be connected to the compressor discharge casing 54. In other embodiments (not shown), the combustion liner 66 may be integrated with the first stage turbine nozzle in a structure that may be known as an integrated exit piece or a transition nozzle.

Figure 3:
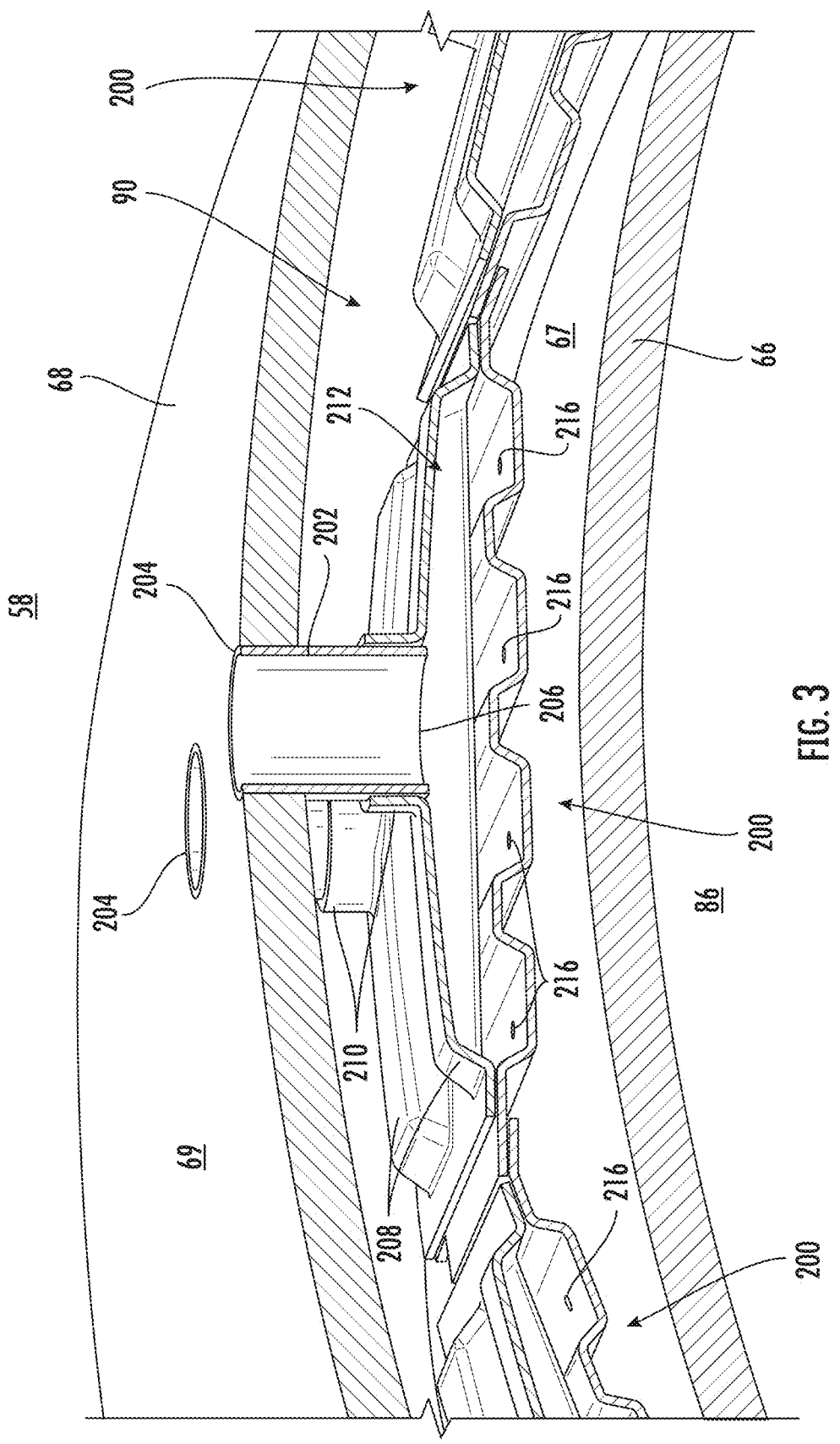
FIG. 3 illustrates a sectioned perspective view of a portion of a combustor for a turbomachine, which includes impingement cooling modules, according to one or more exemplary embodiments of the present disclosure.

As may be seen, e.g., in FIGS. 2 and 3, the flow sleeve 68 may circumferentially surround at least a portion of the liner 66, and the flow sleeve 68 may be spaced from the liner 66 to form a cooling flow annulus 90 (FIG. 3) therebetween. The compressed working fluid 19 (FIG. 2) from the compressor discharge plenum 58 may flow through the cooling flow annulus 90 along the outside of the liner 66 to provide convective cooling to the liner 66 before reversing direction to flow through the head end plenum 72 and the axially extending fuel nozzle 62 (FIG. 2).

In some embodiments, e.g., as illustrated in FIG. 3, one or more impingement modules 200 may be provided. The impingement modules 200 may be provided in any suitable number and/or location as desired to provide impingement cooling to a surface of a hot gas path component, such as an outer surface 67 of the liner 66. For example, a plurality of impingement modules 200 may be provided over all or a majority of the liner 66 in some embodiments. In additional embodiments, the impingement modules 200 may be provided in more limited areas, such as to provide localized cooling, e.g., at one or more hot spots in the component to be cooled, e.g., in the liner 66. In embodiments where localized cooling is provided, the impingement module 200 may be provided, for example, singly or in groups of two, three, or four impingement modules 200 where needed, e.g., depending on the location and size of the hot spot.

Figure 4:
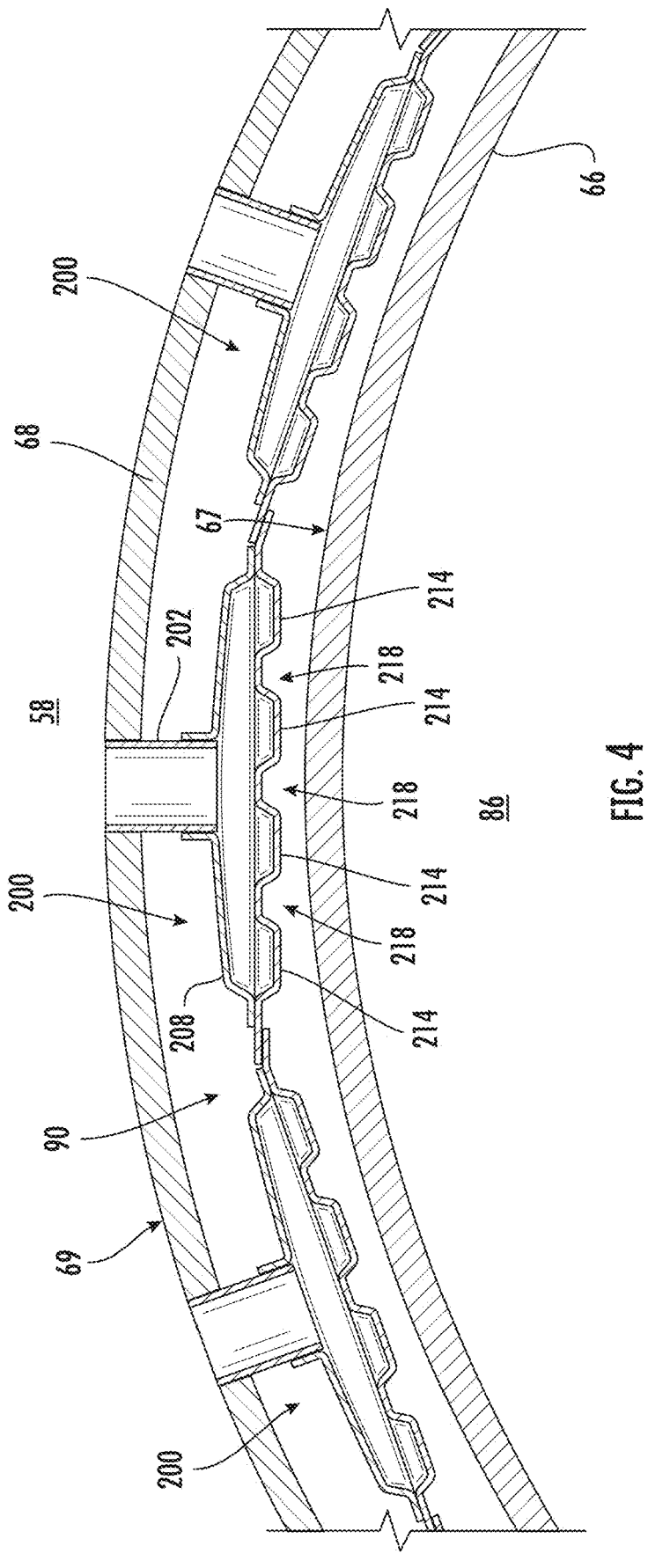
FIG. 4 illustrates a section view of a portion of a combustor with impingement cooling modules for use in a turbomachine, according to one or more exemplary embodiments of the present disclosure.
Figure 5:
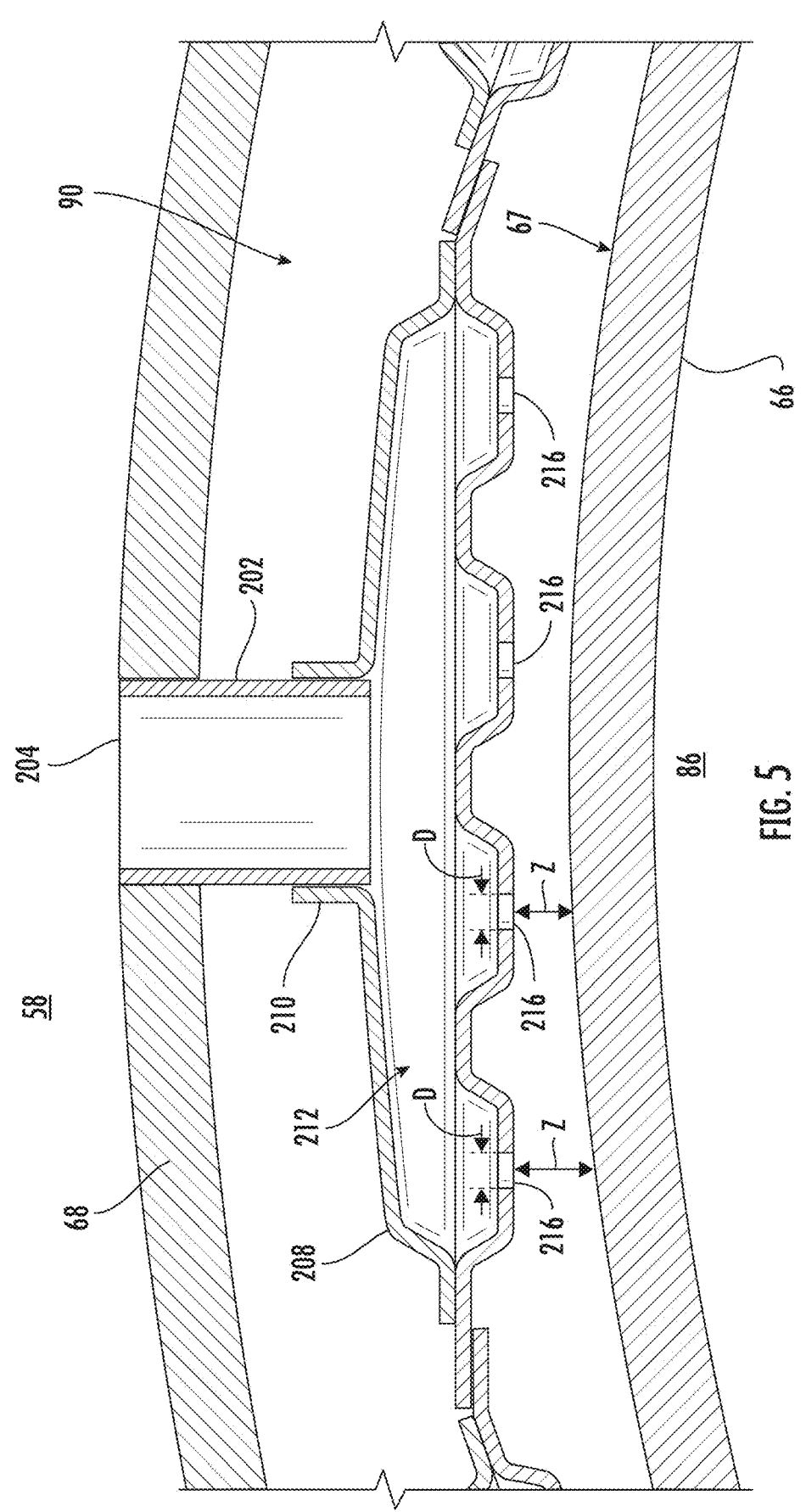
FIG. 5 provides an enlarged view of an impingement module from the portion of the combustor illustrated in FIG. 4.

When more than one impingement module 200 is provided, neighboring impingement modules 200 may be overlapped, e.g., each impingement module 200 may include extensions or flaps which may be placed in contact with, e.g., overlapping, the corresponding flap of the nearest neighboring impingement module 200, e.g., as illustrated in FIGS. 3, 4, and 5. In additional embodiments, the impingement modules 200 may be spaced apart from each other or otherwise not in direct contact.

As may be seen, e.g., in FIGS. 3, 4, and 5, the impingement module 200 (or each impingement module 200, when more than one is provided) may extend into the cooling flow annulus 90, such as the impingement module 200 may extend from the flow sleeve 68 towards the liner 66, e.g., from the flow sleeve 68 into the cooling flow annulus 90, without contacting the liner 66. Thus, the impingement module 200 may provide a flow of cooling medium, e.g., air from the compressor discharge plenum 58, directly to, and impinging on, the liner 66 of the combustor 50 at a particular location. The impingement module 200 may be used in various portions or sections of the turbomachine 10. For example, the impingement module 200 may be positioned proximate to any surface of a component to be cooled, such as a hot gas path component, for cooling such surface. When the impingement module 200 is so positioned and is then connected to a source of pressurized air (and/or other cooling medium) with a sufficient (i.e., large enough) pressure differential to drive the impingement flow through the impingement module 200, the impingement module 200 provides localized impingement cooling to the surface of the component. Accordingly, it will be understood that the description herein of cooling the liner 66 is but one example of many possible implementations for the impingement module 200, and the impingement module 200 may be used with any hot gas path component, e.g., to provide cooling to a surface of such component(s).

As may be seen, e.g., in FIGS. 3, 4, and 5, the impingement module 200 is generally defined between a supply tube 202 and one or more impingement orifices 216, whereby the cooling medium flows into the impingement module 200 at an inlet 204 of the supply tube 202 and exits the impingement module 200 at the one or more impingement orifices 216 which are positioned proximate to and oriented towards the surface to be cooled, e.g., the outer surface 67 of the liner 66.

The supply tube 202 may be oriented generally radially, e.g., generally along a direction that is perpendicular to a longitudinal axis of the component to be cooled, e.g., the combustion liner 66, and may extend from the inlet 204 to an outlet 206. In some embodiments, the inlet 204 of the supply tube 202 may be flush with an outer surface 69 of the flow sleeve 68. The outlet 206 of the supply tube 202 may be coupled to a main body of the impingement module 200 whereby cooling medium flows directly into an internal plenum within the impingement module 200 via the supply tube 202. For example, the impingement module 200 may include a distribution channel 208 which overlies and is in fluid communication with multiple impingement orifices 216 to promote even distribution of cooling medium flow among the multiple impingement orifices 216, and the outlet 206 of the supply tube 202 may be directly coupled to the distribution channel 208. For example, the distribution channel 208 may include a collar 210, and the outlet 206 of the supply tube 202 may be received in the collar 210 of the distribution channel 208.

The distribution channel 208 may be provided in various shapes, e.g., may be elongated as illustrated or may be rounded, e.g., circular, oblong, and/or dome-shaped, or may be any other suitable shape which spans multiple impingement orifices 216 (e.g., the shape of the distribution channel 208 may vary based on the number and arrangement of impingement orifices 216). The distribution channel 208 may include an internal volume, and the internal volume of the distribution channel 208 may at least partially define a distribution plenum 212 within the impingement module 200.

In some embodiments, the cooling medium may flow directly to the one or more impingement orifices 216 from the distribution plenum 212. In additional embodiments, e.g., as illustrated, the impingement orifices 216 may be arranged in and along one or more impingement channels 214. The number of impingement orifices 216 in each impingement channel 214 may vary, such as at least two impingement orifices 216 per impingement channel 214 and at most four impingement orifices 216 per impingement channel 214. For example, providing no more than four impingement orifices 216 per impingement channel 214 may reduce or eliminate cross-flow between impingement orifices 216 in the same impingement channel 214. In such embodiments, the distribution channel 208 and the distribution plenum 212 may extend across each of the impingement channels 214 (e.g., when more than one impingement channel 214 is provided). For example, in some embodiments, the distribution channel 208 may be generally perpendicular to the impingement channels 214. For example, the distribution channel 208 may be generally circumferentially oriented, such as a longitudinal axis of the distribution channel 208 may be generally parallel to a circumferential direction extending around the liner 66, and the impingement channels 214 may be generally axially oriented, e.g., a longitudinal axis of each of the impingement channels 214 may be generally parallel to a central axis of the liner 66 and/or a flow direction of combustion gases through the liner 66.

Figure 12:
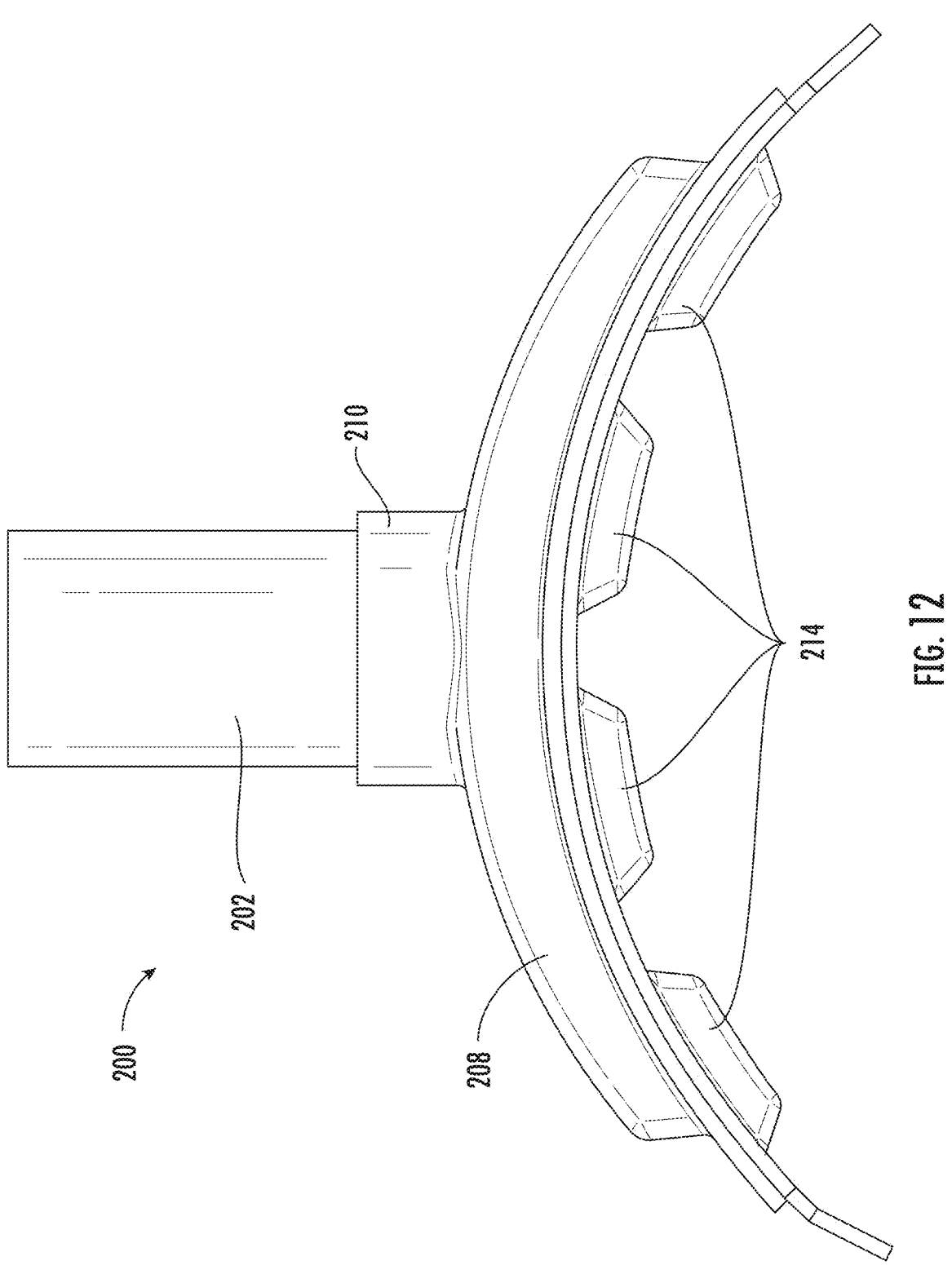
FIG. 12 illustrates an end view of another exemplary embodiment of an impingement module for a turbomachine, according to one or more additional exemplary embodiments of the present disclosure.
Figure 13:
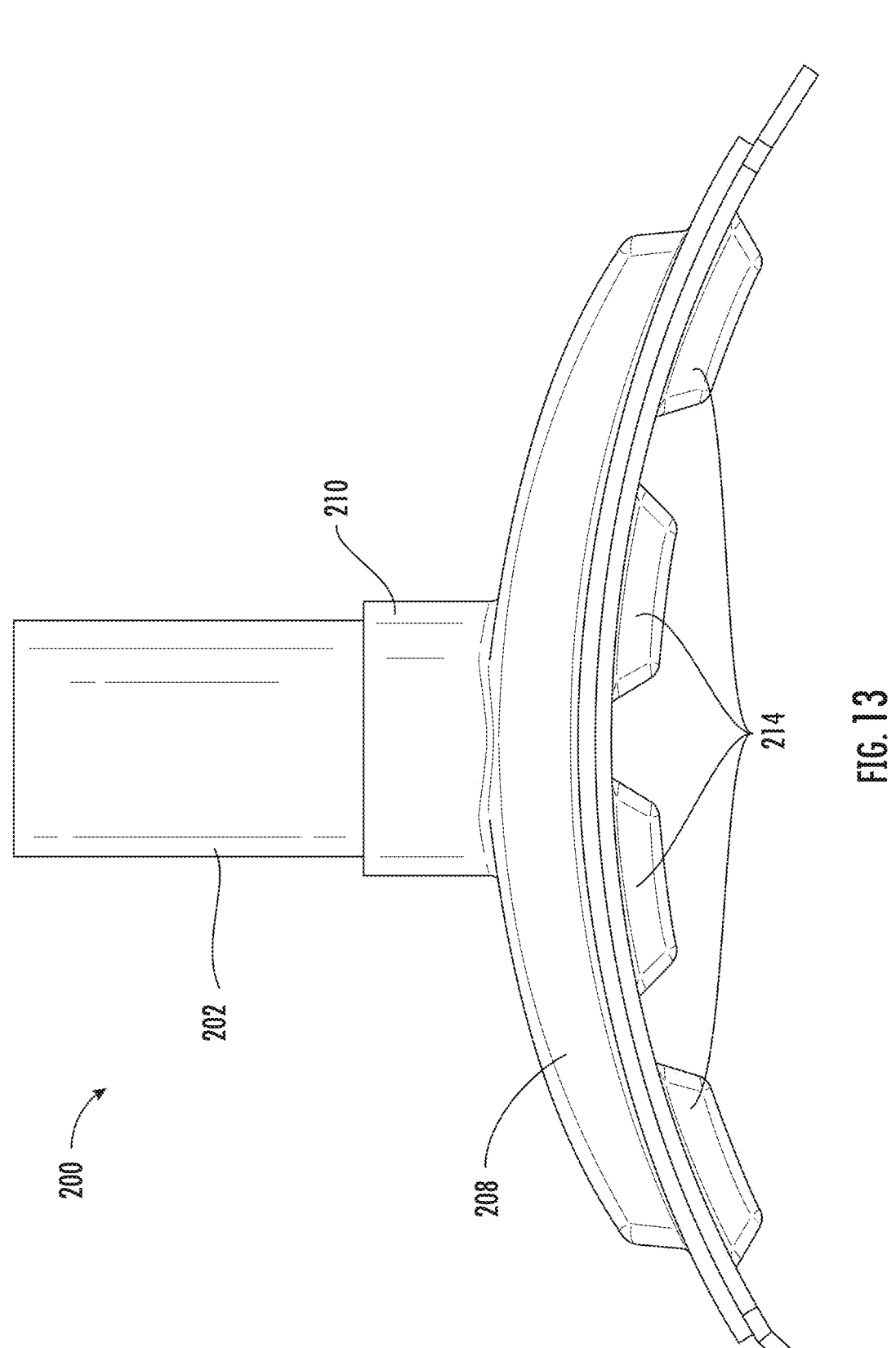
FIG. 13 illustrates an end view of still another exemplary embodiment of an impingement module for a turbomachine, according to one or more additional exemplary embodiments of the present disclosure.

The impingement module 200 may be positioned proximate to the surface to be cooled, e.g., outer surface 67 of liner 66, such that each impingement orifice 216 is spaced apart from the surface to be cooled by a distance, e.g., height, Z (FIG. 5). In some embodiments, the height Z at some impingement orifices 216 may differ from the height Z at other impingement orifices 216, for example as may be seen in FIG. 5, where the impingement module 200 is generally linear and the liner 66 is curved. In additional embodiments, the impingement module 200 may be curved in one or more directions (e.g., axially and/or circumferentially) to match the profile of the surface to be cooled, whereby the height Z at each impingement orifice 216 may be generally the same, such as may be seen in FIGS. 6, 7, 8, 12, and 13. For example, the curvature of the hot gas path component to be cooled may vary, e.g., where the hot gas path component is a combustion liner, such as the exemplary combustion liner 66 illustrated in FIGS. 6-8. For example, the curvature of the hot gas path component, e.g., liner 66, may vary along a longitudinal dimension of the hot gas path component from an aft end to a forward end of the hot gas path component. In such embodiments, a plurality of impingement modules may be provided, with varying degrees of curvature from one impingement module to another, e.g., in order to complement the varying curvature of the hot gas path component and thereby maintain a generally constant height Z. For example, as illustrated in FIG. 12, some impingement modules may have a relatively high degree of curvature (small radius) whereas other impingement modules, e.g., as illustrated in FIG. 13, have a comparatively low degree of curvature (large radius) to complement the varying curvature of the hot gas path component to be cooled. In various embodiments, each impingement orifice 216 is disposed in a bottom surface of the impingement channel 214 that is closest to the outer surface 67 of the combustion liner 66.

The impingement orifices 216 may be sized to provide jets of cooling medium, e.g., the impingement orifices 216 may be relatively small in cross-sectional area to provide a higher velocity flow of cooling medium to the surface to be cooled. For example, the impingement orifices 216 may be cylindrical, e.g., may each have a circular cross-section, and the diameter D (FIG. 5) of each impingement orifice 216 may be sized to provide such flow. The impingement orifices 216 may each have approximately the same diameter D. The impingement module 200 may be sized and positioned such that a ratio of the height Z at each impingement orifice 216 to the diameter D of the respective impingement orifice 216 (e.g., height over diameter or Z/D) is between about one and about five, such as between about two and about four, such as about three or about three and a half. For example, in embodiments where the impingement module 200 is not exactly parallel to the surface to be cooled, e.g., as illustrated in FIG. 5, the Z/D ratio may be smaller at some impingement orifices 216 and may be larger at other nearby impingement orifices 216 of the impingement module 200, where each instance of the z/D ratio falls within the above-mentioned ranges, such as z/D may be three (3) at one impingement orifice 216 and may be three and a half (3.5) at another impingement orifice 216.

The impingement channels 214 may each include a bottom surface, e.g., the surface of the impingement module 200 which is closest to the surface to be cooled. The impingement module 200 may have one or more return channels 218 (FIG. 4) formed between adjacent impingement channels 214. The number of impingement channels 214 and return channels 218 may vary, such as two impingement channels 214 with one return channel 218 therebetween, three impingement channels 214 with two return channels 218 therebetween, four impingement channels 214 and three return channels 218, e.g., as illustrated, five impingement channels 214 with four return channels 218 therebetween, etc., up to and including eight impingement channels 214 with seven return channels 218.

For example, the bottom of the impingement module 200 may be corrugated, as illustrated, such that the impingement channels 214, and in particular the impingement orifices 216 defined in the bottom of each impingement channel 214 may extend below the return channels 218. That is, the return channels 218 may be formed between and above (radially outward of) adjacent impingement channels 214. Accordingly, during operation, the cooling medium may flow from the impingement module 200 through the impingement orifices 216, impinge on and thereby absorb thermal energy from (e.g., cool) the surface 67 to be cooled, and the cooling medium may then, after absorbing the thermal energy, rise (e.g., by convection) and flow away from the surface 67, such as in a generally opposing direction to the impingement cooling flow from the impingement orifices 216 of the impingement module 200. Accordingly, the return channels 218 above the impingement orifices 216 may provide a flow path for such return flow of heated air (and/or other medium) which is separate and away from the impingement cooling flow from the impingement orifices 216, e.g., thereby avoiding or reducing cross-flow between impingement jets from the impingement orifices 216 and warmer return air. In this manner, the impingement flow remains oriented generally directly at and generally perpendicular to the surface from the impingement orifices 216. Additionally, spacing adjacent impingement channels 214 apart from each other by the return channels 218 therebetween may avoid or decrease cross-flow between the impingement orifices 216 of adjacent impingement channels 214.

Figure 6:
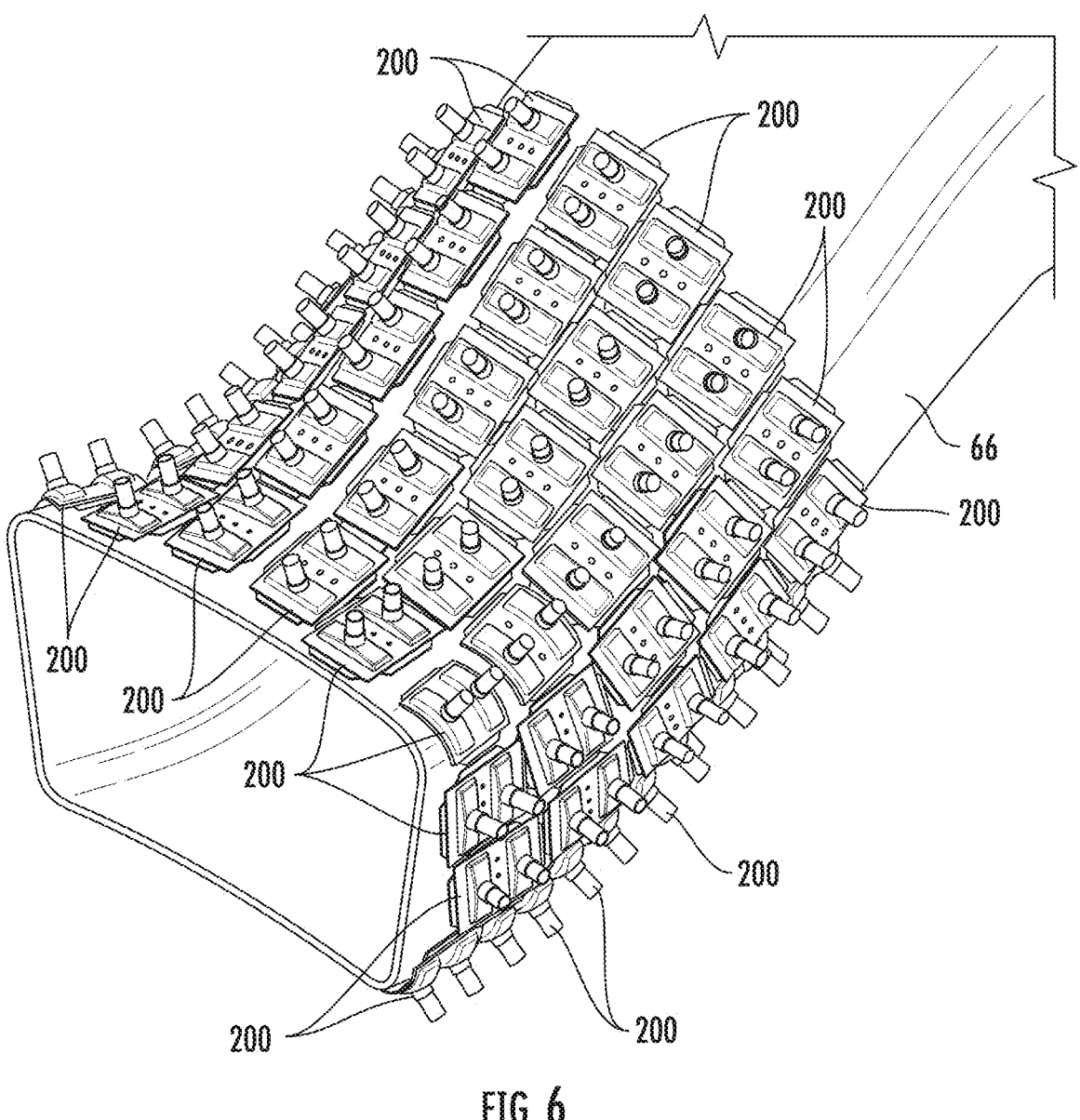
FIG. 6 illustrates a perspective view of a plurality of impingement modules arranged around a liner of combustor for a turbomachine (with a flow sleeve omitted), according to one or more additional exemplary embodiments of the present disclosure.
Figure 7:
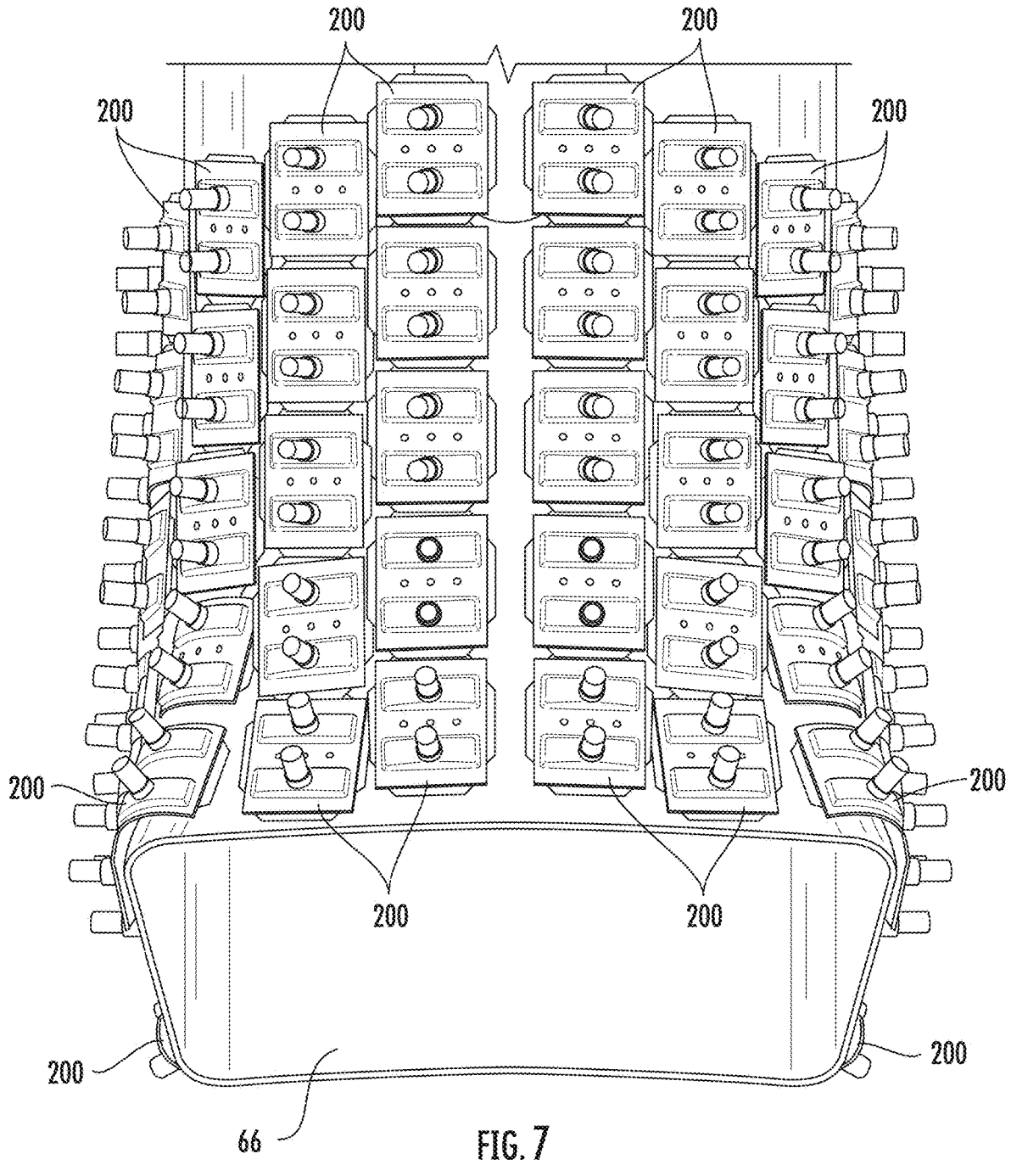
FIG. 7 provides a view looking upstream from an aft end of the liner illustrated in FIG. 6.
Figure 8:
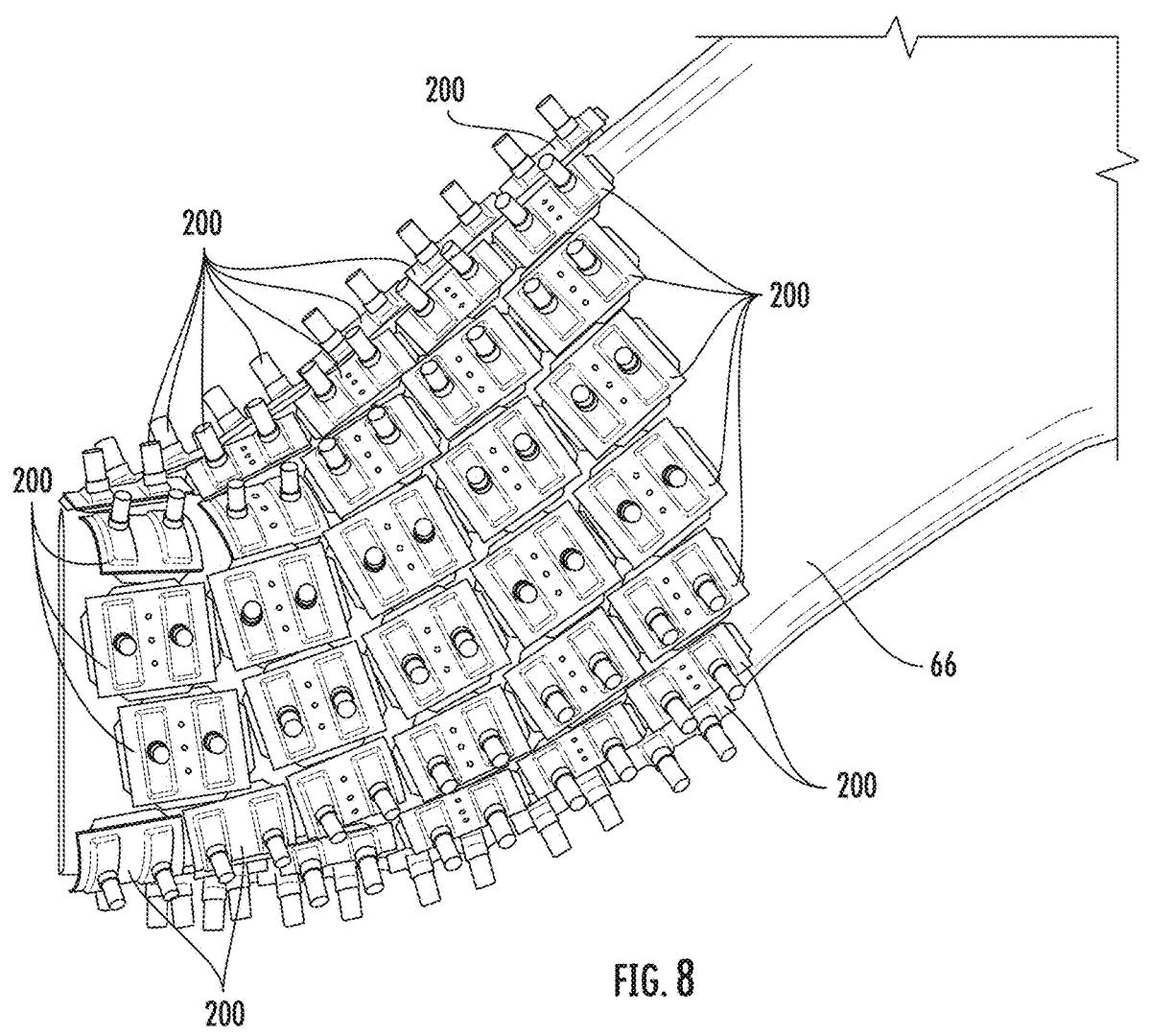
FIG. 8 provides a side view of the liner illustrated in FIG. 6.
Figure 9:
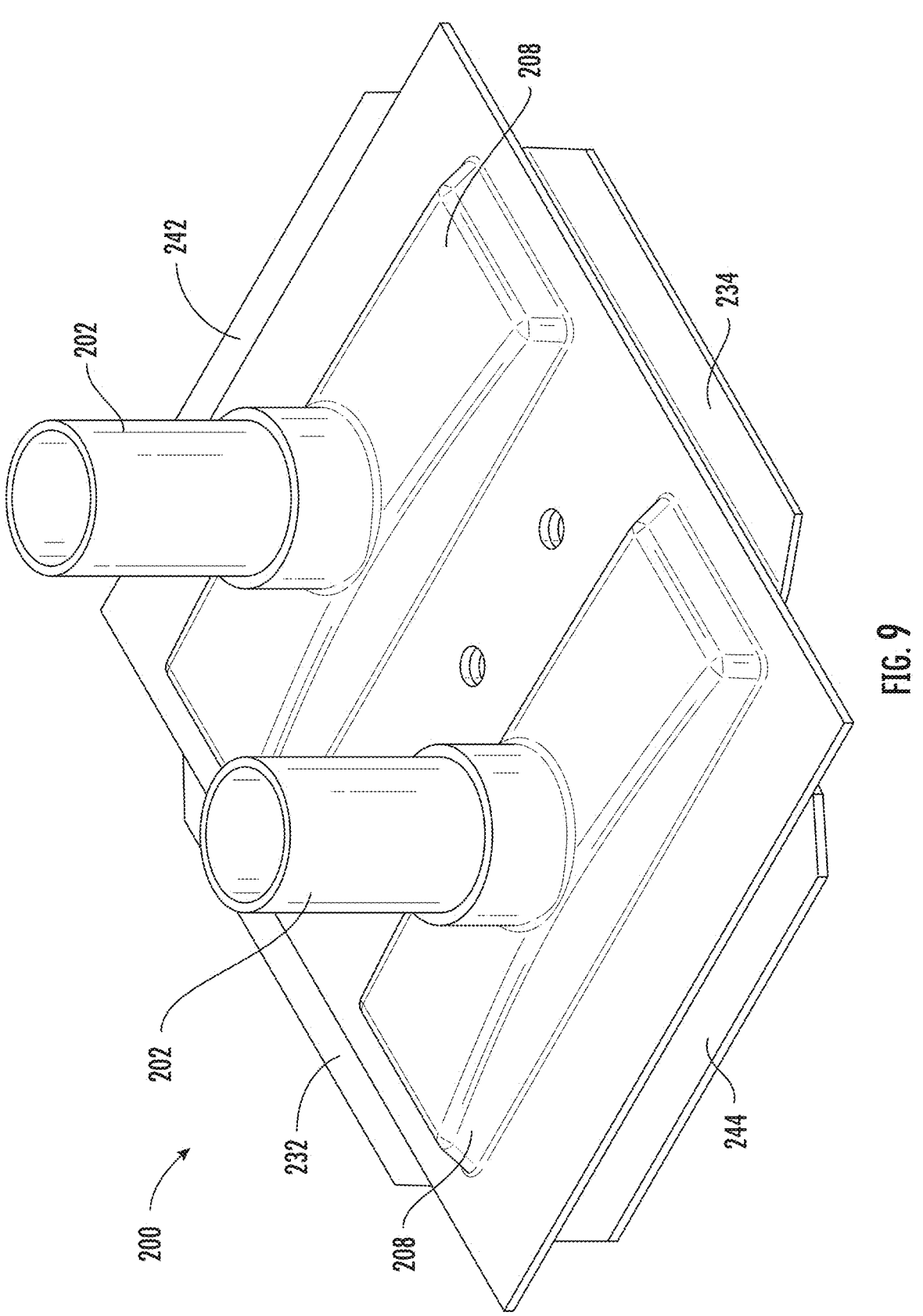
FIG. 9 illustrates a perspective view of an impingement module according to one or more exemplary embodiments of the present disclosure which may be incorporated in a turbomachine, such as the exemplary turbomachine of FIG. 1.
Figure 10:
FIG. 10 provides a partially sectioned perspective view of the impingement module illustrated in FIG. 9.

As shown in FIGS. 9 and 10, the impingement module 200 may include two collars 210 that couple to respective supply tubes 202. The impingement module 200 further includes a pair of distribution channels 208 that distribute the cooling air to the impingement channels 214. As illustrated in FIGS. 6-8, the distribution channels 208 extend in a generally circumferential direction, while the impingement channels 214 extend in a generally axial direction, where the circumferential and axial directions are relative to the longitudinal axis of the combustor 50. To facilitate installation of the impingement modules 200 with adjacent impingement modules 200 (as shown in FIGS. 6-8), a first circumferential edge 232 may be upturned (i.e., extending radially outward from the longitudinal axis of the combustor 50), while an opposite second circumferential edge 234 may be downturned (i.e., extending radially inward toward the longitudinal axis of the combustor 50), such that the first circumferential edge 232 of a first impingement module 200 overlaps the second circumferential edge 234 of a second impingement module 200 that is circumferentially adjacent to the first impingement module 200. Alternately, or additionally, a first axial edge 242 may be upturned, and a second axial edge 244 may be downturned, such that the first axial edge 242 of a first impingement module 200 overlaps the second axial edge 244 of a second impingement module 200 that is axially adjacent to the first impingement module 200.

Figure 11:
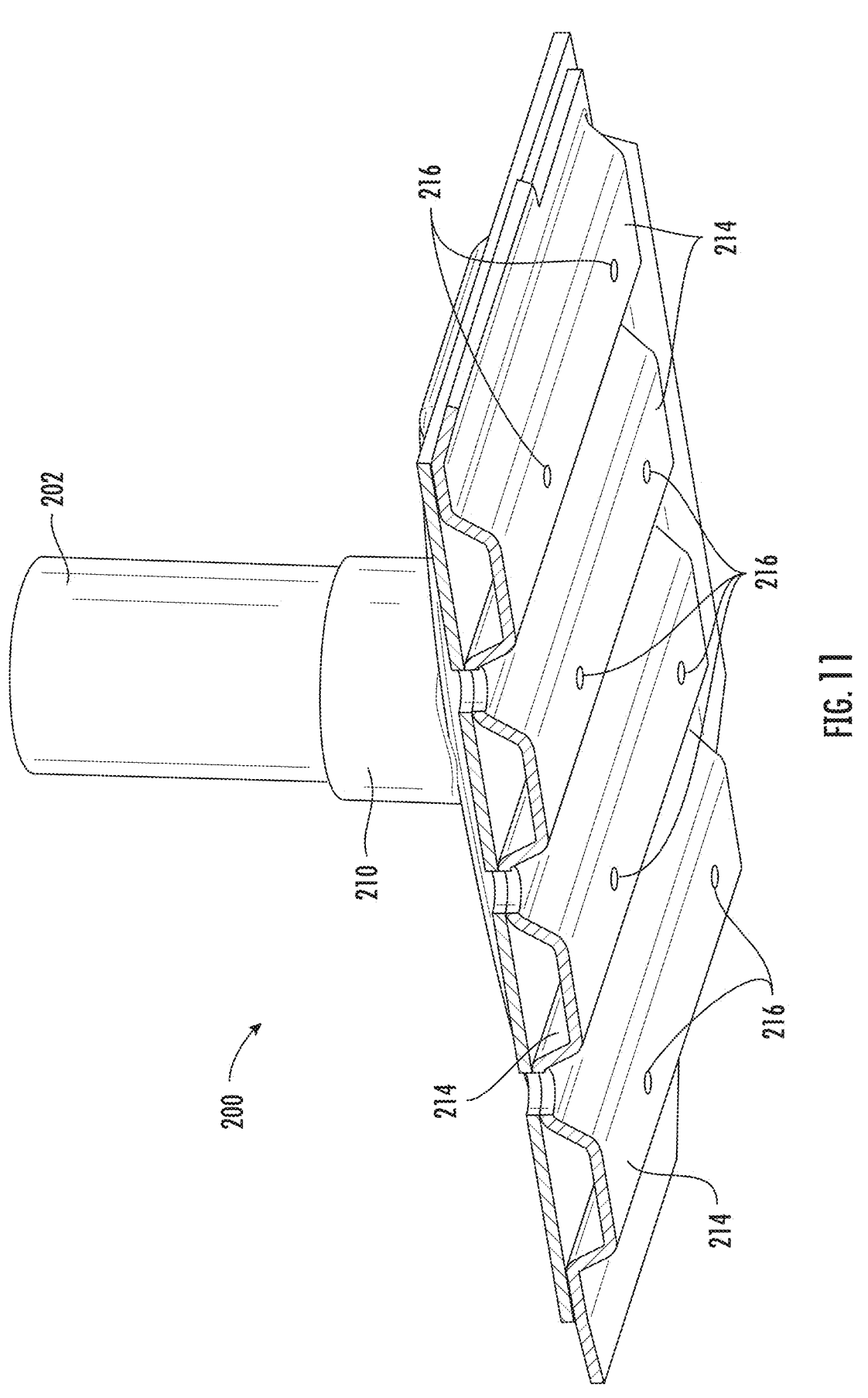
FIG. 11 provides another sectioned perspective view of the impingement module illustrated in FIG. 9.

FIG. 11 provides a bottom perspective view of the impingement module 200, illustrating an exemplary number and arrangement of the impingement orifices 216. Although each distribution channel 214 is shown with two impingement orifices 216, it should be appreciated that other numbers of impingement orifices 216 may instead be used, including arrangements where the impingement orifices 216 are asymmetrically spaced or asymmetrical in number in one distribution channel 214 as compared to another distribution channel 214. In FIG. 11, the impingement module 200 is shown with a single collar 210 and a respective supply tube 202, as an alternative to the embodiment with two collars 210 shown in FIGS. 9 and 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A turbomachine, comprising a compressor extending from an inlet to a discharge, the discharge of the compressor providing a flow of high pressure air directly into a high pressure plenum defined within an outer casing of the turbomachine, a combustor at least partially surrounded by the outer casing, and a turbine downstream of the combustor, wherein the combustor comprises a head end, a liner at least partially defining a hot gas path, a flow sleeve circumferentially surrounding at least a portion of the liner, wherein the flow sleeve is spaced from the liner to form a cooling flow annulus therebetween, the cooling flow annulus in fluid communication with the high pressure plenum whereby air from the high pressure plenum flows into the cooling flow annulus and from the cooling flow annulus to the head end, and an impingement module comprising a plurality of impingement orifices, the impingement module extending into the cooling flow annulus with the plurality of impingement orifices oriented towards an outer surface of the liner whereby the impingement module is configured to direct a flow of air from the high pressure plenum through the impingement orifices to impinge on the outer surface of the liner.

The system of one or more of these clauses, wherein the impingement module comprises a supply tube, the supply tube extending at least partially through the flow sleeve, whereby an inlet of the supply tube is positioned and oriented to receive the flow of air from the high pressure plenum.

The system of one or more of these clauses, wherein the inlet of the supply tube is flush with an outer surface of the flow sleeve.

The system of one or more of these clauses, wherein the impingement module comprises a plurality of impingement channels, wherein the plurality of impingement orifices is defined in the impingement channels.

The system of one or more of these clauses, wherein the impingement module further comprises one or more return channels defined between adjacent impingement channels of the plurality of impingement channels.

The system of one or more of these clauses, wherein the one or more return channels are positioned above the plurality of impingement orifices.

The system of one or more of these clauses, wherein the impingement module comprises a distribution channel upstream of the plurality of impingement orifices.

The system of one or more of these clauses, wherein each impingement orifice of the plurality of impingement orifices is spaced apart from the outer surface of the liner by a height, wherein each impingement orifice of the plurality of impingement orifices defines a diameter, and wherein the height at each impingement orifice is between one time and five times the diameter of the respective impingement orifice.

The system of one or more of these clauses, wherein the impingement module comprises a plurality of impingement channels, wherein the plurality of impingement orifices is equally distributed among the impingement channels.

The system of one or more of these clauses, wherein the impingement module comprises a distribution channel, the distribution channel upstream of the plurality of impingement channels, wherein the plurality of impingement channels is generally parallel to each other, and the distribution channel is oriented generally perpendicular to the plurality of impingement channels.

The system of one or more of these clauses, wherein the impingement module comprises a supply tube coupled to the distribution channel, the supply extending from the distribution channel and at least partially through the flow sleeve.

Further aspects of the invention are provided by the subject matter of the following clauses:

An impingement module for localized cooling a hot gas path component of a turbomachine, comprising a plurality of impingement orifices, the impingement module positioned with the plurality of impingement orifices oriented towards an outer surface of the hot gas path component whereby the impingement module is configured to receive a flow of pressurized air and direct the pressurized air through the impingement orifices to impinge on the outer surface of the component.

The system of one or more of these clauses, further comprising a supply tube, an inlet of the supply tube positioned and oriented to receive the flow of the pressurized air.

The system of one or more of these clauses, further comprising a plurality of impingement channels, wherein the plurality of impingement orifices is defined in the impingement channels.

The system of one or more of these clauses, further comprising one or more return channels defined between adjacent impingement channels of the plurality of impingement channels.

The system of one or more of these clauses, wherein the one or more return channels are positioned above the plurality of impingement orifices.

The system of one or more of these clauses, further comprising a distribution channel upstream of the plurality of impingement orifices.

Further aspects of the invention are provided by the subject matter of the following clauses:

A flow sleeve for a combustor, the combustor comprising a liner at least partially defining a hot gas path wherein the flow sleeve is configured to mount to the combustor whereby the flow sleeve circumferentially surrounds at least a portion of the liner with the flow sleeve spaced from the liner to form a cooling flow annulus therebetween, the flow sleeve comprising a supply tube extending inward towards the liner and an impingement module coupled to the supply tube, the impingement module comprising a plurality of impingement orifices, the impingement module positioned with the plurality of impingement orifices oriented towards an outer surface of the liner whereby the impingement module is configured to direct a flow of air through the impingement orifices to impinge on the outer surface of the liner.

The system of one or more of these clauses, wherein the impingement module comprises a plurality of impingement channels, wherein the plurality of impingement orifices is defined in the plurality of impingement channels.

The system of one or more of these clauses, wherein each impingement orifice of the plurality of impingement orifices is spaced apart from the outer surface of the liner by a height, wherein each impingement orifice of the plurality of impingement orifices defines a diameter, and wherein the height at each impingement orifice is between one time and five times the diameter of the respective impingement orifice.

What is claimed is:

1. A turbomachine, comprising:
a compressor extending from an inlet to a discharge, the discharge of the compressor providing a flow of high pressure air directly into a high pressure plenum defined within an outer casing of the turbomachine;
a combustor at least partially surrounded by the outer casing; and
a turbine downstream of the combustor,
wherein the combustor comprises:
   a head end;
   a liner at least partially defining a hot gas path;
   a flow sleeve circumferentially surrounding at least a portion of the liner, wherein the flow sleeve is spaced from the liner to form a cooling flow annulus therebetween, the cooling flow annulus in fluid communication with the high pressure plenum whereby air from the high pressure plenum flows into the cooling flow annulus and from the cooling flow annulus to the head end; and
   an impingement module comprising a plurality of impingement orifices and a supply tube, the supply tube extending from an inlet to an outlet, the inlet of the supply tube flush with an outer surface of the flow sleeve whereby the inlet of the supply tube is positioned and oriented to receive a flow of air from the high pressure plenum, the supply tube extending from the inlet through the flow sleeve and radially inward from the flow sleeve to the outlet in the cooling flow annulus, wherein the outlet of the supply tube is coupled directly to a main body of the impingement module, whereby the flow of air flows directly into an internal plenum within the main body of the impingement module via the supply tube, with the plurality of impingement orifices oriented towards an outer surface of the liner whereby the impingement module is configured to direct the flow of air from the high pressure plenum through the impingement orifices to impinge on the outer surface of the liner.

2. The turbomachine of claim 1, wherein the impingement module comprises a plurality of impingement channels, wherein the plurality of impingement orifices is defined in the impingement channels.

3. The turbomachine of claim 2, wherein the impingement module further comprises one or more return channels defined between adjacent impingement channels of the plurality of impingement channels.

4. The turbomachine of claim 3, wherein the one or more return channels are positioned above the plurality of impingement orifices.

5. The turbomachine of claim 1, wherein the impingement module comprises a distribution channel upstream of the plurality of impingement orifices.

6. The turbomachine of claim 1, wherein each impingement orifice of the plurality of impingement orifices is spaced apart from the outer surface of the liner by a height, wherein each impingement orifice of the plurality of impingement orifices defines a diameter, and wherein the height at each impingement orifice is between one time and five times the diameter of the respective impingement orifice.

7. The turbomachine of claim 1, wherein the impingement module comprises a plurality of impingement channels, wherein the plurality of impingement orifices is equally distributed among the impingement channels.

8. The turbomachine of claim 7, wherein the impingement module comprises a distribution channel, the distribution channel upstream of the plurality of impingement channels, wherein the plurality of impingement channels is generally parallel to each other, and the distribution channel is oriented generally perpendicular to the plurality of impingement channels.

9. The turbomachine of claim 8, wherein the supply tube extends radially outward from the distribution channel.

10. An impingement module for localized cooling a hot gas path component of a turbomachine, the impingement module comprising:

a main body with an internal plenum defined within the main body;

a supply tube extending from an inlet to an outlet, the inlet of the supply tube positioned and oriented to receive a flow of pressurized air, the outlet of the supply tube coupled directly to the main body of the impingement module, whereby the flow of pressurized air flows directly into the internal plenum within the main body of the impingement module via the supply tube;

a plurality of impingement orifices, the impingement module positioned with the plurality of impingement orifices oriented towards an outer surface of the hot gas path component whereby the impingement module is configured to receive the flow of pressurized air into the internal plenum within the main body and direct the pressurized air from the internal plenum within the main body through the impingement orifices to impinge on the outer surface of the hot gas path component.

11. The impingement module of claim 10, further comprising a plurality of impingement channels, wherein the plurality of impingement orifices is defined in the impingement channels.

12. The impingement module of claim 11, further comprising one or more return channels defined between adjacent impingement channels of the plurality of impingement channels.

13. The impingement module of claim 12, wherein the one or more return channels are positioned above the plurality of impingement orifices.

14. The impingement module of claim 10, further comprising a distribution channel upstream of the plurality of impingement orifices.

15. A flow sleeve for a combustor, the combustor comprising a liner at least partially defining a hot gas path wherein the flow sleeve is configured to mount to the combustor whereby the flow sleeve circumferentially surrounds at least a portion of the liner with the flow sleeve spaced from the liner to form a cooling flow annulus therebetween, the flow sleeve comprising:

a supply tube extending from an inlet to an outlet, the inlet of the supply tube flush with an outer surface of the flow sleeve, the supply tube extending from the inlet through the flow sleeve and radially inward towards the liner from the flow sleeve to the outlet; and an impingement module coupled to the supply tube, the impingement module comprising:

a main body with an internal plenum defined within the main body, and a plurality of impingement orifices, wherein the outlet of the supply tube is coupled directly to the main body of the impingement module, whereby a flow of air flows directly into the internal plenum within the main body of the impingement module via the supply tube, the impingement module positioned with the plurality of impingement orifices oriented towards an outer surface of the liner whereby the impingement module is configured to direct the flow of air from the internal plenum within the main body through the impingement orifices to impinge on the outer surface of the liner.

16. The flow sleeve of claim 15, wherein the impingement module comprises a plurality of impingement channels, wherein the plurality of impingement orifices is defined in the plurality of impingement channels.

17. The flow sleeve of claim 15, wherein each impingement orifice of the plurality of impingement orifices is spaced apart from the outer surface of the liner by a height, wherein each impingement orifice of the plurality of impingement orifices defines a diameter, and wherein the height at each impingement orifice is between one time and five times the diameter of the respective impingement orifice.

18. The turbomachine of claim 1, wherein the internal plenum is defined entirely within the main body of the impingement module, and wherein the main body of the impingement module is positioned entirely within the cooling flow annulus and spaced apart from each of the liner and the flow sleeve.

19. The impingement module of claim 10, wherein the internal plenum is defined entirely within the main body of the impingement module, and wherein the internal plenum is the only plenum of the impingement module.

20. The flow sleeve of claim 15, wherein the internal plenum is defined entirely within the main body of the impingement module, and wherein the main body of the impingement module is spaced apart from an inner surface of the flow sleeve.

* * * * *